United States Patent Office 2,711,967
Patented June 28, 1955

2,711,967

WATER-REPELLANT COMPOSITION

Leandro W. Tomarkin, Spring Valley, N. Y.

No Drawing. Application August 2, 1952,
Serial No. 302,410

3 Claims. (Cl. 106—287)

This invention relates to a composition for rendering masonry or the like, water repellant.

Silicones have been used as the essential ingredient of a number of water repellant compositions. However, such silicones are of the type which are soluble only in organic solvents. More recently, silicones have been prepared which are soluble in water and have water repelling properties.

However, the water soluble silicones, when applied to a porous surface such as masonry or the like, show rather limited penetration. Furthermore, the material may be applied only as a single coating since the initial coating almost immediately acts as a barrier to subsequent coatings. It is apparent that with limited penetration and the inability to apply multiple coatings, the water repelling properties of the water soluble silicone is quite restricted.

Accordingly, an object of this invention is to provide an improved water-proofing composition having as an active ingredient thereof, a water soluble silicone, such composition having the property, upon application to a porous surface such as masonry, to penetrate the same to a substantial depth.

A further object of this invention is to provide an aqueous solution of silicone having a modifying agent added thereto, such solution being applicable to masonry in the form of a multiple coating whereby a predetermined depth of penetration by the solution may be achieved.

Another object of this invention is to provide an aqueous solution containing as an active ingredient thereof, a water soluble silicone in monomeric form which is converted to polymeric form upon evaporation of the water, together with a selected penetrant which permits the solution to be applied to a masonry surface in amounts sufficient to render such treated surface resistant to penetration by water under hydrostatic pressure or by impact of air at relatively high velocities.

Other objects of this invention will in part be obvious and in part hereinafter pointed out.

The invention accordingly consists in the selection of ingredients and the combination thereof as set forth in the embodiments hereinafter disclosed.

The water soluble silicone hereinafter described is essentially a monsodium salt of methyl siliconic acid and is designated as sodium methyl siliconate. In dilute aqueous solution the salt apparently exists in monomeric form having the formula: $[CH_3Si(OH)_2O^-]Na^+$.

Upon drying, the compound loses water and forms a polymer having the formula: $[CH_3SiO_2Na]X$, such polymer redissolving in cold water.

Such silicone is commercially available as a 20% aqueous solution. When the solution, which may be further diluted, is applied to a masonry surface such as brickwork or the like, a water repellant surface is formed upon evaporation of the water. In the event that it is desired to apply a second coating of the material in order to insure a perfectly applied, continuous coating or to increase the amount of impregnant per unit of surface, such second coating is unable to penetrate the initially coated surface and in fact, runs off the initial surface coating.

It has been found that upon adding a small amount of a selected wetting agent to the water solution of the silicone, that the penetration of the solution is improved and further, that supplemental coatings may be applied over an initial coating to insure optimum water repellency. Furthermore, the presence of the wetting agent does not in any way detract from the overall water repellency of the proofing composition.

By way of illustration and for the purpose of explaining the invention, a proofing composition was prepared as follows:

A 20% aqueous solution of sodium methyl siliconate was mixed with a 25% solution of sodium tetradecyl sulfate in the proportion of 6 parts of the former to 0.1 part of the latter, all by weight and diluted with 93.9 parts by weight of distilled or demineralized water.

The application of the composition to masonry such as brick resulted in a reduction of water absorption of as much as 98.8%. Additionally, a second coating of the composition could be applied to the initially coated surface without difficulty.

It has been found that the proportions of the ingredients of the aqueous solution may be varied within the following range: from 1.0 to 5.0 parts of sodium methyl siliconate may be mixed with from .01 to .1 part of sodium tetradecyl sulfate and diluted with from 94.6 to 98.99 parts of water, all by weight.

The resultant composition has been found to be quite stable with its water repellant characteristics substantially unimpaired over extended periods of storage.

It will be apparent that the use of the composition of the invention not only provides for improved water repellant masonry construction and the like, but additionally will be available in very economical form due to the elimination of the usual organic solvents.

As changes can be made in the embodiment of the invention described without departing from the spirit thereof, it is understood that all material set forth in the foregoing disclosure shall be interpreted in an illustrative sense.

Having thus disclosed my invention, I claim as new and desire to protect by Letters Patent:

1. A water repellant composition consisting of an aqueous solution containing sodium methyl siliconate and a lesser amount of sodium tetradecyl sulfate as a wetting agent.

2. A water repellant composition consisting of by weight, from 1.0 to 5.0 parts of sodium methyl siliconate, from .01 to .1 part of sodium tetradecyl sulfate and from 94.6 to 98.99 parts water.

3. A water repellant composition consisting of an aqueous solution of a monosodium salt of methyl siliconic acid in monomeric form, and from 0.01 to 0.10 part by weight of sodium tetradecyl sulfate, said salt being convertible to polymeric form upon evaporation of water.

References Cited in the file of this patent

UNITED STATES PATENTS

| | | |
|---|---|---|
| 2,114,042 | Bertsch | Apr. 12, 1938 |
| 2,441,422 | Krieble et al. | May 11, 1948 |
| 2,507,200 | Elliott et al. | May 9, 1950 |
| 2,574,168 | Brick | Nov. 6, 1951 |